United States Patent [19]

Miyabe et al.

[11] Patent Number: 5,531,901
[45] Date of Patent: Jul. 2, 1996

[54] METHOD OF TREATMENT OF A FLUID CONTAINING VOLATILE ORGANIC HALOGENATED COMPOUNDS

[75] Inventors: Kanji Miyabe; Nobuhiro Orita; Makoto Iwasaki; Yohka Tsurumaru; Toshitsugu Nakahara, all of Tokyo, Japan

[73] Assignee: Kurita Water Industries, Ltd., Tokyo, Japan

[21] Appl. No.: 450,573

[22] Filed: May 25, 1995

Related U.S. Application Data

[62] Division of Ser. No. 32,573, Mar. 17, 1993, Pat. No. 5,490,941.

[30] Foreign Application Priority Data

Mar. 25, 1992 [JP] Japan .................................. 4-98727
Apr. 23, 1992 [JP] Japan .................................. 4-129975

[51] Int. Cl.$^6$ ................................................ B01D 53/34
[52] U.S. Cl. .................. 210/668; 210/673; 210/719; 210/757; 210/908; 210/909; 210/747; 95/142; 95/148; 423/240 S; 423/245.1; 588/207
[58] Field of Search ............................ 210/757, 719, 210/668, 673, 908, 909, 747; 95/142, 148; 588/207; 423/240 S, 245.1, 245.3, 488, 240 R

[56] References Cited

U.S. PATENT DOCUMENTS

| | | | |
|---|---|---|---|
| 3,892,818 | 7/1975 | Scharfe et al. | 423/240 S |
| 4,022,795 | 5/1977 | Bamfield et al. | 260/578 |
| 4,045,538 | 8/1977 | Sare et al. | 423/240 |
| 4,059,676 | 11/1977 | Yang et al. | 423/240 S |
| 4,059,683 | 11/1977 | Lindberg et al. | 423/481 |
| 4,126,433 | 11/1978 | Forssberg et al. | 95/142 |
| 4,159,309 | 6/1979 | Faul et al. | 210/757 |
| 4,323,372 | 4/1982 | Bentz et al. | 45/142 |
| 4,351,978 | 9/1982 | Hatano et al. | 210/909 |
| 4,400,566 | 8/1983 | Colon | 585/359 |
| 4,618,686 | 1/1986 | Boyer | 564/305 |
| 4,623,448 | 11/1986 | O'Connell et al. | 588/207 |
| 4,661,256 | 4/1987 | Johnson | 210/634 |
| 4,747,937 | 5/1988 | Hilfman et al. | 208/262 |
| 4,816,138 | 3/1989 | Visser et al. | 210/668 |
| 4,849,095 | 7/1989 | Johnson et al. | 208/212 |
| 4,859,216 | 8/1989 | Fritsch | 95/142 |
| 4,861,484 | 8/1989 | Lichtin et al. | 210/908 |
| 4,861,921 | 8/1989 | Fellmann et al. | 568/772 |
| 4,909,947 | 3/1990 | Johnson et al. | 210/737 |
| 4,931,187 | 6/1990 | Derham et al. | 210/662 |
| 5,009,872 | 4/1991 | Chuang et al. | 423/245.3 |
| 5,013,424 | 5/1991 | James, Jr. et al. | 208/78 |
| 5,015,365 | 5/1991 | Vara et al. | 95/142 |
| 5,035,875 | 7/1991 | Daish | 423/580.1 |
| 5,051,030 | 9/1991 | Saha et al. | 210/757 |
| 5,057,125 | 10/1991 | Lankton et al. | 95/142 |
| 5,064,447 | 11/1991 | Lee | 95/142 |
| 5,151,263 | 9/1992 | Okazaki et al. | 423/659 |
| 5,176,897 | 1/1993 | Lester | 423/240 S |
| 5,190,668 | 3/1993 | Chuang | 210/750 |
| 5,206,003 | 4/1993 | Imoto et al. | 423/240 S |
| 5,220,108 | 6/1993 | Hashimoto et al. | 588/208 |
| 5,245,112 | 9/1993 | Hoshimoto et al. | 588/206 |
| 5,358,646 | 10/1994 | Gloyna et al. | 210/762 |
| 5,374,599 | 12/1994 | Ishii et al. | 502/326 |

FOREIGN PATENT DOCUMENTS

| | | | |
|---|---|---|---|
| 178001 | 4/1986 | European Pat. Off. | |
| 448976 | 2/1991 | European Pat. Off. | |
| 412456 | 2/1991 | European Pat. Off. | |
| 499644 | 8/1992 | European Pat. Off. | 423/240 S |
| 2285355 | 9/1975 | France | |
| 3249920 | 11/1991 | Japan | 423/240 S |
| 565708 | 9/1977 | U.S.S.R. | 423/240 S |
| 1400529 | 12/1972 | United Kingdom | |
| 87/00157 | 1/1987 | WIPO | 423/240 S |
| 90/13352 | 11/1990 | WIPO | |

OTHER PUBLICATIONS

Baltzby and Phillips, "The Catalytic Hydrogenalysis of Halogen . . . ", J. of the Amer. Chem. Soc., 68, pp. 261–265, Feb. 1946.

*Primary Examiner*—Cynthia L. Nessler
*Attorney, Agent, or Firm*—Millen, White, Zelano, & Branigan

[57] ABSTRACT

A method for decomposing volatile organic halogenated compounds in water containing such compounds and metal ions by removing the metal ions from the water and then contacting the deionized water with a reducing agent in the presence of a catalyst. The volatile organic halogenated compounds are efficiently decomposed with a small energy requirement and low cost to eliminate, thus, making the water safe.

10 Claims, 3 Drawing Sheets

METHOD OF TREATMENT OF A FLUID CONTAINING VOLATILE ORGANIC HALOGENATED COMPOUNDS

This is a division of application Ser. No. 08/032,573 filed Mar. 17, 1993, now U.S. Pat. No. 5,490,941.

BACKGROUND OF THE INVENTION

1. Field of the Invention

The present invention relates to a novel method of treatment of a fluid such as water or a gas containing a volatile organic halogenated compound. More particularly, it relates to a practically advantageous method of treating such a fluid with a reducing agent in the presence of a catalyst, thereby decomposing the volatile organic halogenated compound contained in and rendering the fluid ecologically harmless.

2. Description of the Prior Art

Volatile organic halogenated compounds must be removed from a ground and waste waters and from soil because they cause environmental pollution. Various methods have been examined for the treatment of service and waste waters containing volatile organic halogenated compounds. Examples of such methods are; (1) aeration treatment, (2) adsorption treatment, (3) decomposition treatment by oxidation, (4) biological treatment and (5) thermal decomposition. However, these methods have various problems and are not satisfactory.

For example, method (1) simply transfers the organic halogenated compounds from the underground water or soil to the atmosphere and does not bring a fundamental solution to the environmental problem. Method (2) can catch or recover the organic halogenated compounds and is applied in combination with the method (1) in many cases. This method has a problem in that the adsorption capacity of the adsorbent, such as an activated charcoal, is inevitably decreased by the influence of moisture. The method of adsorption has another problem that the adsorbent must be regenerated. When it is regenerated using steam, a waste water containing a high concentration of the organic halogenated compounds is discharged.

For the fundamental solution of the environmental pollution, a degradation method of the organis halogenated compounds, such as the methods (3) to (5), is required. The method of decomposition by oxidation (3) has been actively examined for the decomposition of the halogen compounds. Many reports can be found on the methods utilizing ultraviolet light, ozone, hydrogen peroxide and the like. Fewer reports are also found on the decomposition by methods (4) and (5).

In the methods of decomposition by oxidation and thermal decomposition described above, a large amount of energy is required for generation of ultraviolet light and ozone or for heating. Thus, these methods have problems that they inevitably lead to a higher cost of treatment and that organic halogenated compounds may be newly generated because the halogen formed by the decomposition reaction easily reacts with organic compounds present in the environment. The biological decomposition method (4) requires less amount of energy for the treatment but microbiological system which can efficiently decompose the organic halogenated compounds has not been discovered. Thus, biological decomposition is not practical either. A method of decomposition by reduction utilizing iron powder as a reducing agent was reported but this method is not yet practical either.

SUMMARY OF THE INVENTION

The present invention accordingly has an object to overcome the problems of the conventional methods of treatment of fluids containing volatile organic halogenated compounds and to provide a practical method of treatment of a fluid, such as water or a gas, containing a volatile organic halogenated compound which efficiently decomposes the volatile organic halogenated compound with a small amount of energy and renders the fluid ecologically harmless.

Extensive investigations undertaken by the present inventors with the objects described above lead to a discovery that, when a fluid containing a volatile organic halogenated compounds are brought into contact with a reducing agent in the presence of a metal catalyst, the volatile organic compound or compounds therein is efficiently decomposed to harmless hydrocarbons, carbon dioxide and hydrogen halides. Hydrogen halides generated do not easily react again with organic compounds present in the environment. It was also discovered that the products of the decomposition as well as the volatile organic halogenated compounds themselves can be effectively made harmless by subjecting the decomposed fluid to an additional treatment, such as an adsorption treatment, thermal decomposition treatment or biological decomposition treatment. The present invention has been completed on the basis of the discovery.

In one aspect, the method of this invention comprises bringing a fluid containing a volatile organic halogenated compound in contact with a reducing agent in the presence of a metal catalyst.

In another aspect, the method of this invention comprises bringing a fluid containing a volatile organic halogenated compound into contact with a reducing agent in the presence of a metal catalyst and then subjecting the treated fluid to at least one treatment selected from the group consisting of an adsorption treatment, a thermal decomposition treatment and a biological treatment.

Other and further objects, features and advantages of the invention will appear more completely in the following description,

BRIEF DESCRIPTION OF THE DRAWINGS

The invention will be described with reference to the accompanying drawings, wherein.

Figure 1:
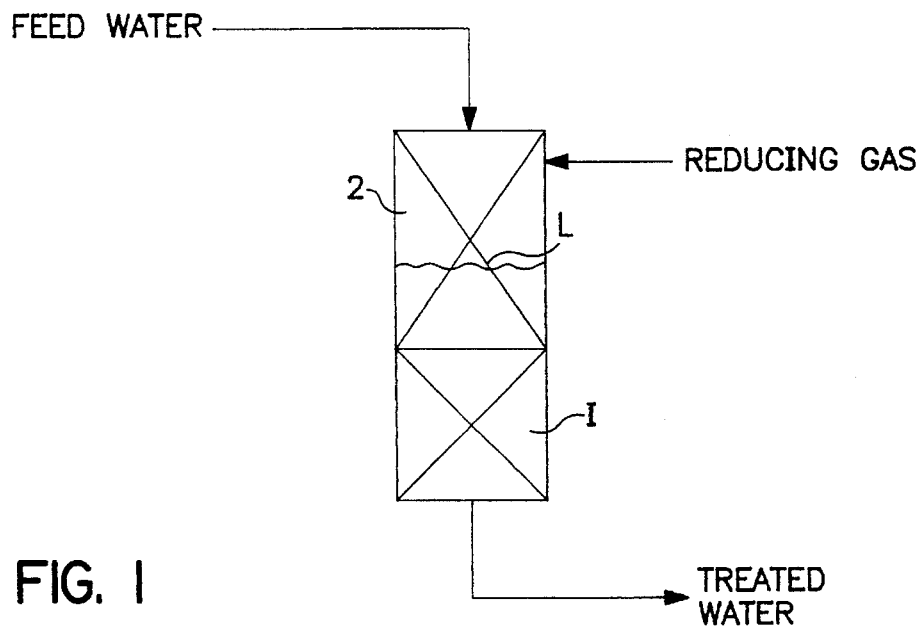
FIG. 1 is a chart showing schematically an example of the apparatus for conducting the one-step methods of this invention on water described in Examples 11 and 14.

The numbers and characters in the figures have the following meanings:
1: a column of catalyst
2: a column of packing 3: an air-stripping tower
3A: an air-stripping tower
3B: an air-stripping tower
4: a column of adsorbent
5: a phase separation tank
9: an aeration tank
10: a tank for mixing gases

DETAILED DESCRIPTION OF THE INVENTION

The invention is now described in detail.

The volatile organic halogenated compound which is decomposed in accordance with the present invention has a boiling point generally of 150° C. or lower, preferably 80° C. or lower. Examples of the volatile organic halogenated compound are trichloroethylene, tetrachloroethylene, trans-1,2-dichloroethylene, cis-1,2-dichloroethylene, carbon tetrachloride, chloroethane, methylene chloride, chloroform, vinyl chloride, 1,1-dichloroethane, 1,2-dichloroethane, 1,2-dichloropropane, dichlorobromoethylene, 1,1,1-trichloroethane, bromodichloromethane, chlorodibromomethane, bromoform, various kinds of chlorofluorohydrocarbons or chlorofluorocarbons (referred to as "flons" hereinafter) and the like.

Examples of liquid fluids containing volatile organic halogenated compounds which can be treated by the method of the invention are a water discharged from various kinds of manufacturing processes, a service water, a drainage water and an underground water, fluids obtained by extracting the volatile organic halogenated compounds contained in soil with water and the like, and discharge water produced during regeneration of an adsorbent with steam after the adsorbent is brought into contact with volatile organic halogenated compounds, and the like fluids.

Examples of gaseous fluids containing volatile organic halogenated compounds are a gas discharged from various kinds of manufacturing processes, a gas obtained by aeration treatment and the like treatment of a waste water or a soil containing the volatile organic halogenated compounds with air, nitrogen gas or the like. The volatile organic halogenated compounds in a liquid material, such as a waste water, can be recovered easily by aeration with a gas, such as nitrogen gas or air. In this method, an airstripping tower is advantageously utilized. The water containing volatile organic halogenated compounds is charged at the top of the air-stripping tower and the air or a nitrogen gas is blown into the bottom of the tower. The fluid containing the volatile organic halogenated compounds and air, nitrogen gas or the like are brought into counter current contact with each other and the volatile organic halogenated compounds are transferred to the gas phase according to the Henry's law in the stripping tower. The air-stripping tower is generally filled with packings, such as Raschig rings.

The volatile organic halogenated compounds contained in soil can be recovered by blowing the air into the soil through a number of pipes inserted into the soil with a blower to trap the compounds into a tank. They also can be extracted with a liquid fluid, such as water, and the compounds thus transferred to the liquid fluid can be recovered by the aeration.

The catalyst used in the invention is a metal catalyst supported on a carrier. Examples of the metal catalyst are palladium, platinum, ruthenium, rhodium, copper, iron, iridium, nickel and the like. Preferred examples are catalysts of noble metals, such as palladium, platinum, ruthenium, rhodium and the like. More preferred examples are catalysts of palladium and platinum. As the metal catalyst, all elementary metal or oxide or hydroxide of the metal can be utilized.

Examples of the carrier are alumina, titania, activated charcoal, zirconia, zeolite, glass, silica-alumina ion exchange resins, plastic pellets and the like. Preferred examples are alumina, titania, silica and ion exchange resins. As the ion exchange resin, weak basic anion exchange resins based on copolymers of styrene and divinyl benzene are preferred. The amount of the metal supported on the carrier is generally 0.1 to 10 weight % based on the carrier.

The shape of the carrier is not particularly limited. Any shape, such as powder, granule and pellet, can be utilized. When the carrier has a granule or pellet shape, it can be packed into a column and the fluid to be treated can be passed through the column continuously. When the carrier has a shape of powder, it can be packed into a column and the operation can be conducted in the condition of the fluidized bed.

As the reducing agent, a reducing gas, such as hydrogen gas, or a reducing agent which generates hydrogen by the contact with the catalyst described above, such as hydrazine, hydroxylamine and sodium hydride, preferably is utilized in the decomposition treatment by reduction in the liquid phase. In the decomposition treatment by reduction in the gas phase, a reducing gas, such as hydrogen gas, is preferably utilized. The hydrogen gas can be supplied by electrolysis, from a tank, by utilizing a hydrogen absorbing metal and from the like sources. The amount of the reducing agent for use is preferably 1 to 80 times the equivalent of the agent required for substitution of the halogen contained in the volatile organic halogenated compounds in the decomposition by reduction in the liquid phase and 100 to 100,000 volume parts per 1 volume part of the halogenated compounds in the decomposition by reduction in the gas phase. When the decomposition treatment is conducted in the gas phase and hydrogen is utilized as the reducing agent, the concentration of hydrogen gas in the air is not allowed to exceed 4%. The temperature of the decomposition treatment by reduction is in the range from 60° to 120° C. in the decomposition in the gas phase and in the range from 10° to 60° C. in the decomposition in the liquid phase. A higher temperature within these ranges is desirable.

The method of the invention are described more specifically in the following.

(1) When the fluid for treatment is a water, the water sometimes contains substances which adversely affect the performance of the catalyst in the liquid phase. It is preferred that such substances are removed before the water is treated. The substances may adversely affect through chemical effects on the catalytic reaction itself and through physical effects, such as fouling of the catalyst surface.

Examples of the substances adversely affecting the treatment in the liquid phase are metal ions, such as iron, manganese and hardness components. For removing the metal ions, treatment by ion exchange, treatment with a chelate resin and like treatments can be utilized. For removing iron and manganese ions, oxidation and coagulation-precipitation can also be utilized.

(2) When the fluid-for treatment is a water containing the volatile organic halogenated-compounds and a reducing gas, such as a hydrogen gas, is utilized as the reducing agent, it is advantageous that the reducing agent is dissolved in the water before being treated by the reduction in the liquid phase. In an example of the method of dissolving the reducing agent in the water prior to treatment, water containing volatile organic halogenated compounds is charged at the top of a column packed with a packing such as glass beads over a catalyst layer and flows down in such a way that continuous vacant spaces are maintained in the packed column. The reducing gas is also charged to the top of the column and is passed concurrently downwardly through it in such a way that the gas passes through the continuous vacant spaces in the column. Upon contacting the water containing the volatile organic halogenated compounds, the reducing gas is dissolved in the water during its passage through the column. The reducing gas can also be dissolved in the water utilizing a porous membrane.

FIG. 1 illustrates schematically an example of an apparatus favorably utilized for performing the method of invention. The apparatus of FIG. 1 has a structure in which a catalyst layer 1 packed with a metal catalyst is positioned at the lower part of a column and a packed layer 2 packed with packings like glass beads is positioned at the upper part of the same column over the catalyst layer.. Water containing the volatile organic halogenated compounds (feed water) is charged at the top of packed layer 2 and the reducing gas is charged from another inlet positioned at the top of the packed layer 2. The water for treatment and the gas are brought into contact with each other in the packed layer 2 to dissolve the reducing gas in the water for treatment. The water is then treated at the catalyst layer 1 by catalytic reduction and the treated water is discharged from the bottom of catalyst layer 1. The liquid level is shown by L.

The apparatus shown in FIG. 1 is one of the preferred apparatus for performing the method of the invention but the apparatus for performing the method of the invention is not limited to this example. As another example, the packed layer and the catalyst layer are not placed within the same column but in separate columns connected to each other.

(3) When the fluid for treatment is a gas containing the volatile organic halogenated compounds, the gas generally also contains moisture. Moisture adversely affects the decomposition treatment by reduction in a gas phase. Particularly when the gas is generated by an aeration before the decomposition by reduction, relative humidity of the gas is near 100% and an effective method of decreasing the humidity (water) is important for achieving the stable decomposition treatment by reduction in the gas phase for a long period at high speed, such as SV of 5000 hr-1 or more. Thus, it is preferred that a step of decreasing the relative humidity of the gas for treatment is included in the process before the decomposition treatment by reduction in the gas phase.

The method of decreasing the relative humidity is not particularly limited. Examples of such method are: (1) heating the gas for treatment or the catalyst layer; (2) mixing dry air with the gas for treatment; (3) removing the moisture with an ion exchange resin; and like methods.

In method (1), the heating can be accomplished using a heater, a heat pump, a Root's blower and the like. In method (2), the dry air can be obtained by dehumidifying by PSA (pressure swing adsorption) or by using a heat pump. In method (3), a sodium type strong cation exchange resin or the like can be used as a dehumidifying material. Other methods, such as a method utilizing a membrane, a method utilizing an industrial adsorbent and the like, may be adopted as well.

The relative humidity to be achieved varies depending on the chemical properties and the structure of the surface of the catalyst carrier and can be selected suitably according to them. For example, when platinum/γ-alumina is utilized as a catalyst, the ability of decomposition by reduction is remarkably enhanced by reducing the relative humidity generally to 60% or less, preferably 40% or less and more preferably to 20% or less.

Another method for eliminating the adverse effect of moisture is to utilize a metal catalyst which has been subjected to hydrophobic treatment. The hydrophobic catalyst can be prepared by coating the carrier with polytetrafluoroethylene and the like and then by loading the metal catalyst on the carrier.

(4) When the fluid for treatment contains a high concentration of the volatile organic halogenated compounds, treatment of the fluid creates problems. For example, when the fluid is a gas, the amount of the reducing gas, such as a hydrogen gas, used for the treatment must be increased to a level of increased danger of explosion and, when the fluid is a liquid, the amount of the reducing gas must be increased like the case of the gaseous fluid and a pressure vessel must be utilized and the reducing gas must be added at a high pressure. Therefore, when a fluid containing a high concentration of the volatile organic halogenated compounds is treated, it is preferred that the concentration of the volatile organic halogenated compound in the fluid is first decreased by bringing the fluid into contact with an adsorbent before the decomposition treatment and then only the residual volatile organic halogenated compounds in the fluid is treated by the decomposition by the reduction process. A high concentration of volatile organic halogenated compounds in fluid generally means a concentration of 100 volume ppm or more when the fluid is gas and a concentration of 20 ppm or more when the fluid is liquid.

When the fluid for treatment is a water containing a high concentration of volatile organic halogenated compounds, the water may be brought into contact with an adsorbent without such a pretreatment or may be treated with aeration in advance to produce a stripped gas which is then brought into contact with an adsorbent.

Examples of the adsorbent are activated charcoal, silica, zeolite and the like, of which charcoal is preferred. The shape of the adsorbent is not particularly limited and various shapes, such as powder, granule, fiber, non-woven fabric and woven fabric, may be used. The adsorbent is generally utilized as packing in a column. The form of the packed column is not particularly limited but various forms, such as fixed bed, fluidized bed and honey comb rotary form, may be utilized. The amount of the adsorbent is not particularly limited but generally in the range from 10 to 1,000 g per 1 gram of volatile organic halogenated compounds.

It is preferred that the concentration of the volatile organic halogenated compounds in the fluid after the treatment with the adsorbent described above is generally several tens volume ppm or less when the fluid is a gas and 10 ppm or less when the fluid is a liquid. When the concentration is in this range, the treatment of catalytic reduction in the next process can be facilitated. The speed of charging the fluid to the adsorbent is in the range from several hundreds to 10,000 $hr^{-1}$ when the fluid is a gas and in the range from 10 to several tens $hr^{-1}$ when the fluid is a liquid, respectively, as expressed by space velocity.

After the adsorption of the volatile organic halogenated compounds, the adsorbent can be regenerated with a heated gas, such as steam or nitrogen. The volatile organic halogenated compounds are present in the water or gas discharged from the regeneration in very high concentrations and the volatile organic compounds are preferably recovered therefrom as much as possible. The residual compounds remaining after the recovering treatment are decomposed by catalytic reduction.

Figure 2:
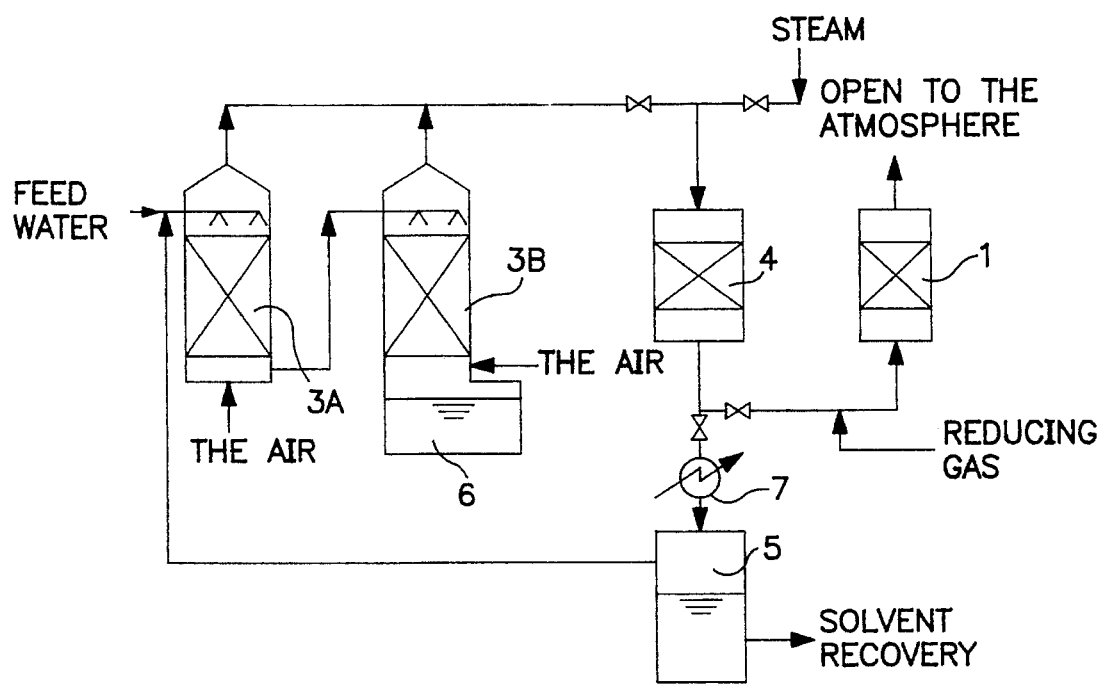
FIG. 2 is a chart showing the outline of an example of the apparatus described at pages 13–16 for treatment of a fluid containing a high concentration of volatile, organic, halogenated compounds.

FIG. 2 shows schematically an example of the apparatus utilized for performing the method of invention. Water to be treated (feed water) containing the volatile organic halogenated compounds is charged at the top of air-stripping tower 3A and, at the same time, air is blown into the bottom of the tower. The air containing the volatile organic halogenated compounds is discharged from the upper part and the treated water is discharged from the bottom of air-stripping tower 3A. The treated water is then charged at the top of the next air-stripping tower 3B and air is blown into the bottom of the tower, The air streams containing the volatile organic halogenated compounds discharged from the tops of the air-stripping towers 3A and 3B are combined together and charged into the top of the adsorbent column 4. The treated water discharged from the bottom of the air-stripping tower 3B is stored in treated water tank 6. The stored treated water is utilized or discharged depending on the purpose of the operation. This example describes the operation utilizing two air-stripping towers. However, the method is not limited to two towers.

In adsorbent column 4, the volatile organic halogenated compound are removed by adsorption with the hydrophobic interaction. The air, from which most of the volatile organic halogenated compounds have been removed, is charged to the bottom of the catalyst column 1 together with the reducing gas, such as hydrogen gas, and the residual volatile organic halogenated compounds in the air is decomposed by reduction. The air thus treated is discharged into the atmosphere from the upper part of the catalyst column 1.

When the adsorbent column 4 is saturated with the volatile organic halogenated compounds, the charging of the air containing volatile organic halogenated compounds is stopped and steam is fed to the top of the adsorbent column 4 in order to regenerate the adsorbent in the column 4. The steam containing the volatile organic halogenated compounds discharged from the bottom of the adsorbent column 4 is condensed in the condenser 7 and stored in the phase separation tank 5. In the separation tank 5, the fluid is separated to the upper layer of a saturated water containing the volatile organic halogenated compounds and the lower layer of the volatile organic halogenated compounds. The water containing the volatile organic halogenated compounds at the upper layer is recycled to the feed water line. The volatile organic halogenated: compounds at the lower layer are recovered for reuse as a solvent.

In this example, the volatile organic halogenated compounds in the water for treatment are first transferred to the air by the aeration and then treated. However, the water can be treated without such intermediate an treatment.

(5) By the same method as in (4), the fluid containing the volatile organic halogenated compounds is brought into contact with the adsorbent to remove the volatile organic halogenated compounds therefrom. Then, the adsorbent is regenerated with a nitrogen gas. The volatile organic halogenated compounds discharged by the regeneration are decomposed by reduction by bringing the nitrogen gas into contact with a reducing agent in the presence of a metal catalyst. The fluid containing the volatile organic halogenated compounds is thus efficiently treated by the method described above.

Figure 3:
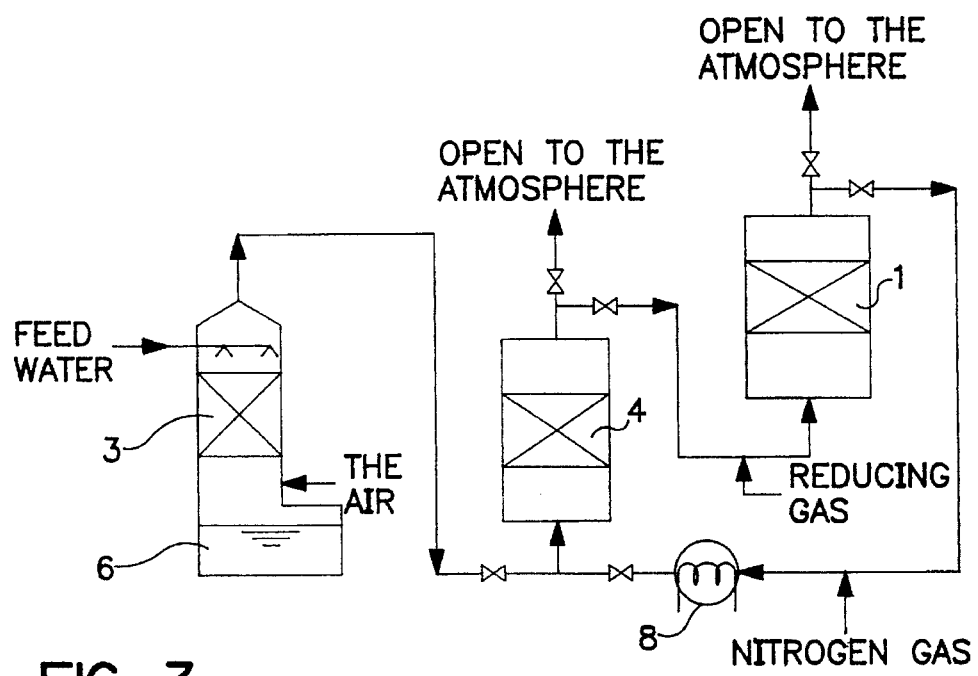
FIG. 3 is a chart showing the outline of an example of the apparatus for conducting the methods described in Example 19.

FIG. 3 is a chart schematically showing the apparatus for conducting the method described above. Water for treatment (feed water) containing the volatile organic compounds is charged at the top of air-stripping tower 3 and, at the same time, air is blown into the bottom of tower 3. In the air-stripping tower, the volatile organic halogenated compounds are transferred to the air and the thus-treated water is stored in a tank 6. The gas containing the volatile organic halogenated compounds is sent to adsorbent column 4 and the volatile organic halogenated compounds contained in the gas are removed by adsorption. The air from column 4 is discharged into the atmosphere.

When the amount of the organic halogenated compounds adsorbed in adsorbent 4 has reached to the saturation point, a nitrogen gas heated to 100° to 200° C. by a heater or heat exchanger 8 is introduced in order to regenerate the adsorbent. The volatile organic halogenated compounds adsorbed in the adsorbent are transferred to the nitrogen gas by this operation. The nitrogen gas containing the volatile organic halogenated compounds is then introduced to catalyst column 1 together with a reducing gas, such as a hydrogen gas, and the volatile organic halogenated compounds are thus decomposed by reduction. The nitrogen gas discharged from the decomposition process may be utilized for the regeneration of the adsorbent.

In this example, the volatile organic halogenated compounds in the water for treatment are transferred to the air by aeration and then treated. However, the water can be treated without such intermediate treatment.

(6) By the same method as in (4), the fluid containing volatile organic halogenated .compounds is brought into contact with the adsorbent to remove the volatile organic halogenated compounds therefrom. Then, the adsorbent is regenerated with steam. The volatile organic halogenated compounds in the condensed water discharged by the regeneration or in the gas by the aeration of the discharged condensed water are decomposed by reduction by bringing the condensed water discharged from the regeneration step or the gas from the aeration of the discharged condensed water into contact with the reducing agent in the presence of the metal catalyst. The fluid containing volatile organic halogenated compounds is efficiently treated as described above.

Figure 4:
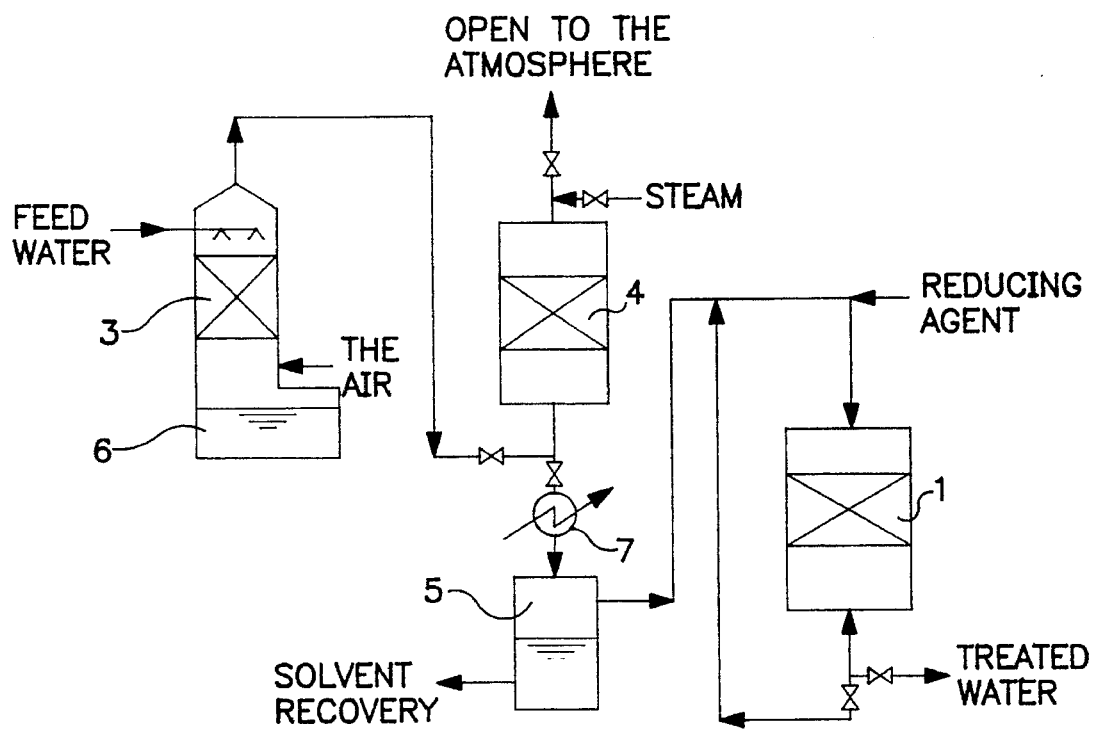
FIG. 4 is a chart showing schematically an apparatus for conducting the method of Example 20.

FIG. 4 is a chart showing schematically the apparatus for conducting the method described above. Water for treatment (feed water) containing the volatile organic compounds is charged at the top of air-stripping tower 3 and, at the same time, air is blown into the bottom of air-stripping tower 3. In the air-stripping tower, the volatile organic halogenated compounds are transferred to the air and removed. The treated water is stored in a tank 6. The gas containing the volatile organic halogenated compounds is sent to adsorbent column 4 and the volatile organic halogenated compounds therein are removed by adsorption. The air from column 4 is discharged into the atmosphere.

When the amount of the organic halogenated compounds adsorbed to adsorbent in the adsorbent column 4 has reached to the saturation point, steam is sent to the adsorbent to regenerate it. The gas discharged by the regeneration step is condensed with condenser 7 and the condensed fluid is sent to separation tank 5, where the fluid is separated to the upper layer of water containing the volatile organic halogenated compounds and the lower layer of the volatile organic halogenated compounds. The volatile organic halogenated compounds forming the lower layer are recovered for reuse as a solvent. The saturated water containing the volatile organic halogenated compounds forming the upper layer is sent to the catalyst column 1 after addition of a reducing agent, such as a hydrogen gas. The volatile organic halogenated compounds contained in the water are decomposed by reduction and the treated water is discharged. When the amount of the volatile organic halogenated compounds in the treated water is more than a specified amount, the treated water is recycled to the charge line to the catalyst column and the decomposition by reduction is repeated.

Figure 5:
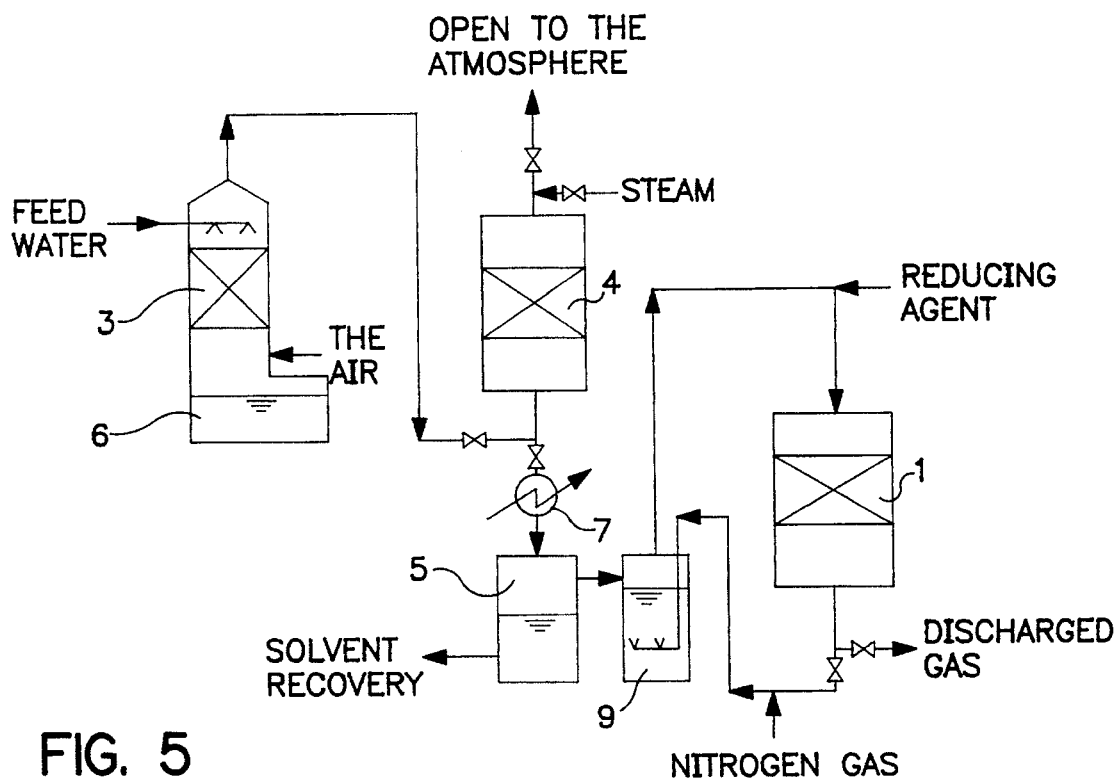
FIG. 5 is a chart showing schematically another apparatus for conducting the methods described Example 21.

FIG. 5 is a chart schematically showing another example of the apparatus for conducting the method described above. The water from separation tank 5 is transferred to serration tank 9 and the water is treated by aeration with an inert gas, such as a nitrogen gas, to transfer the volatile organic halogenated compounds into a gas phase. After adding a reducing gas, such as a hydrogen gas, to the gas containing the volatile organic halogenated compounds, the mixed gas is transferred to catalyst column 1 by the same method as described above and the volatile organic halogenated compounds are decomposed by reduction. The gas discharged from catalyst column 1 may be discarded or reused as the gas for aeration.

In this example, the volatile organic halogenated compounds in the water for treatment are transferred to the air by the aeration and then treated. However, the water for treatment can be treated without such intermediate treatment.

(7) The fluid containing volatile organic halogenated compounds generally also contains oxygen. Competitive reactions of the volatile organic halogenated compounds and the oxygen with the hydrogen takes place in the reduction degradation treatment. As the reducing agent is consumed by the reaction with oxygen to a larger extent, the efficiency of the reduction is decreased further and naturally a large amount of the reducing agent is required. For this reason, it is necessary to reduce the adverse influence of oxygen present in the reaction system on the performance of this reduction treatment.

The method of multi-stage reduction is effective for overcoming this problem. For example, when hydrogen gas is utilized as the reducing gas, the relation between removal of the volatile organic halogenated compounds and the amount of the added hydrogen in the gas phase is as following. The removal rate increases greatly with an increase in the amount of added hydrogen when the amount of added hydrogen is rather small. However, the increase in removal rate when the total amount of added hydrogen when the amount of the added hydrogen is large. In this case, the efficiency is low. A similar relationship can be observed irrespective of the concentration of the volatile organic halogenated compounds. Because of this relationship, the multi-stage reduction method is more efficient than the single stage reduction method. When the same amount of a reducing agent, such as a hydrogen gas, is used, the multi-stage reduction method provides more effective treatment. When the same performance is to be achieved by the two methods, the amount of the reducing agent utilized in the treatment can be decreased by adopting the multi-stage reduction method.

Thus, it is preferred that a metal catalyst is positioned as layers of multiple stages and the fluid containing the volatile organic halogenated compounds is passed through the stages of the catalyst successively while the reducing agent is added before the each catalytic layer.

Figure 6:
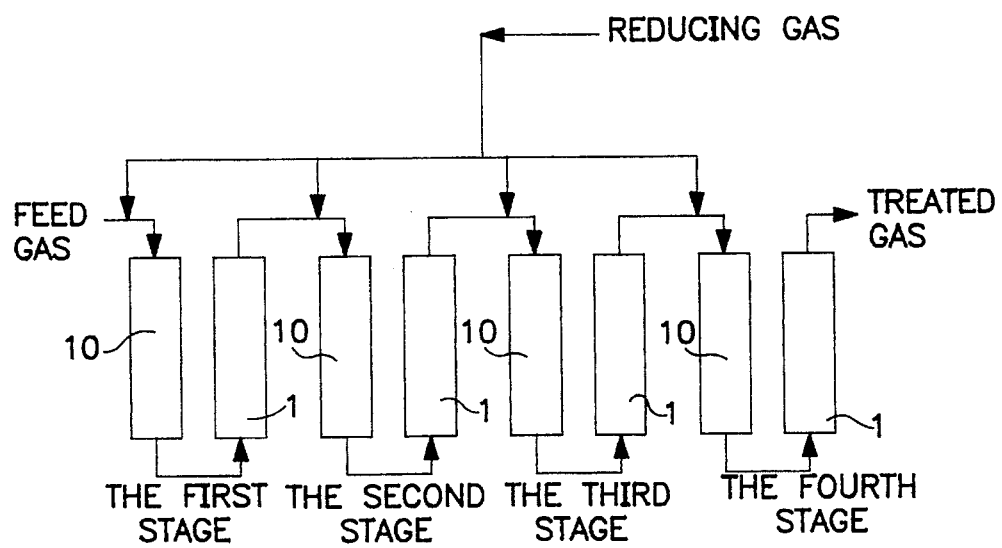
FIG. 6 is a chart showing schematically an apparatus for conducting the methods described in Example 28.

FIG. 6 is a chart schematically showing an example of the apparatus for conducting the method described above in each of the stages placed in series, a gas mixing tank 10 is placed before catalyst column 1. In this figure, an apparatus having four stages is shown. However, the number of stages is not particularly limited, provided it is two or more. Gas mixing tank 10 is not necessary when the gas for treatment and a reducing gas, such as a hydrogen gas, is sufficiently mixed by a suitable method, such as by line injection. .

Gas for treatment (feed gas) is charged to tank 10 of first stage and then passes through catalyst column 1 of the first stage, tank 10 and catalyst column 1 of the second stage, tank 10 and catalyst column 1 of the third stage and tank for mixing the gases 10 and catalyst column 1 of the fourth stage, successively. The reducing gas, such as hydrogen gas, is fed to each of the mixing tanks of the four stages. The volatile organic halogenated compounds are decomposed by reduction in each of the catalyst columns 1 of the four stages.

In the example described above, the treatment of decomposition by reduction in the gas phase is explained. The method can be applied to a treatment in the liquid phase in the same way.

The fluid treated as described above contains unreacted compounds and reaction products, such as hydrogen-halides and hydrocarbons, and it is preferably treated on at least one post-treatment selected from the group consisting of an adsorption treatment, a thermal decomposition and a biological decomposition treatment. The adsorbent utilized for the adsorption treatment is activated charcoal, natural or synthetic zeolite, silica gel, activated alumina, silica-alumina or the like. The form of the packed column for the adsorbent is not particularly limited and any of a fixed bed form, a fluidized bed form, a honey comb rotatory form and the like may be adopted.

For the regeneration of the adsorbent which has adsorbed the unreacted compounds and the reaction products, steam or heated gas, such as the heated air and nitrogen, are utilized. The unreacted compounds and the reaction products removed from the adsorbent is preferably recycled to the decomposition by reduction process for complete decomposition before they are discharged to the atmosphere. The fluid treated with the adsorbent may be either a gas or a liquid.

Hydrocarbons contained in the fluid are decomposed to carbon dioxide and water. The fluid is preferably heated after hydrogen halides contained in the fluid are removed. For removal of the hydrogen halides, a method such as absorption with an alkaline aqueous solution or water, removal by contact with an adsorbent containing sodium hydroxide, potassium hydroxide, calcium hydroxide, sodium carbonate or the like on it and like other methods, can be utilized.

The hydrogen halide removal treatment and the thermal decomposition are generally carried out in the gas phase. When the fluid treated with the decomposition by reduction is a gas, the fluid can be introduced to the hydrogen halide removal process and then to the thermal decomposition process directly. When the fluid is a liquid, it is preferred that the fluid is treated with aeration with air or the like. The gas generated by the aeration is there introduced to the hydrogen halide removal process and to the thermal decomposition process.

As the method of thermal decomposition, decomposition by simply heating the fluid, decomposition by catalytic heat oxidation comprising heat treatment in the presence of a catalyst and other like methods can be utilized. In the method of decomposition by catalytic heat oxidation, the same kinds of metal catalysts as those utilized for decomposition by reduction can be utilized. The air can be mixed with the gas to be treated when necessary. The temperature of the thermal decomposition is generally in the range from about 400° to 500° C. in the methods described above.

When the fluid treated with the decomposition by reduction is treated by biological decomposition, hydrocarbons formed by the decomposition by reduction of the volatile organic halogenated compounds are biologically decomposed easily, For the biological decomposition treatment, microorganisms having the ability of decomposing hydrocarbons, such as activated sludge, can be utilized. It is preferred in the biological decomposition method that the fluid treated with the decomposition by reduction is a gas. The biological decomposition is generally conducted by bringing the gaseous fluid into contact with the microorganisms having the ability of decomposing hydrocarbons. When the fluid treated with the decomposition by reduction is a gas, the fluid can be introduced into the biological decomposition process directly. When the fluid is a liquid, it is preferred that the fluid is treated with aeration using air or the like. The gas from the aeration is then introduced to the biological decomposition process.

As a method of bringing the fluid into contact with the material containing the microorganism, the method of passing the fluid through a column packed with the packings to which the microorganisms are fixed the method of treating the fluid with suspended activated sludge and like methods can be adopted. When the packed column method is adopted, the velocity of the gas passed through the column is 200 to 5000 hr$^{-1}$ at the space velocity. As the packing material, activated charcoal, plastics like polystyrene foam, peat, zeolite and the like can be utilized. Water is sprayed on the packings from time to time. When the suspended activated sludge method is adopted, the gas for the treatment can be introduced in a conventional activated sludge treatment plant.

The adsorption treatment, the thermal decomposition and the treatment and the biological decomposition treatment described above may be utilized singly or as a combination of two or more treatments.

When the volatile organic halogenated compounds in the fluid for treatment are flons, hydrogen fluoride is generated during the reduction decomposition treatment. For preventing degradation of the catalytic activity by the hydrogen fluoride thus formed, a catalyst of a noble metal supported on a carrier resistant to hydrogen fluoride is preferably utilized. Examples of such carriers are organic carriers, such as resins like polyesters, fluororesins, fibers and the like other organic-carriers, and inorganic carriers, such as zeolite, silica, silica alumina, titania, zirconia and the like other inorganic carriers. Examples of noble metals supported on a carrier are elementary metals, such as platinum, palladium, indium, rhodium, gold, osmium, silver and rhenium, and multi-component metals comprising two or more of these metals.

To summarize the advantages obtained by the invention, the method of the intention decomposes efficiently the volatile organic halogenated compounds contained in a fluid (water or gas) by catalytic reduction with a small amount of energy to make the compounds harmless. The method is operated with low cost and practically highly advantageous.

The invention will be understood more readily with reference to the following examples; however, these examples are intended to illustrate the invention and are not to be construed to limit the scope of the invention.

EXAMPLE 1

Into a Vial bottle of 22 ml inner volume, 10 ml of a solution containing about 300 ppb of trichloroethylene were taken as a sample. To the solution, 0.5 g of a catalyst, which was prepared by deposition of 0.5 weight % of a metal on γ-alumina and 3.2 mg of hydrazine were added. The mixture was well stirred at 25° C. Samples were taken from the head space at the upper part of the bottle from time to time at specified time intervals and analyzed by a gas chromatography.

Blank tests in which hydrazine was not added were also carried out for comparison. The results are shown in Table 1.

TABLE 1

| catalyst metal | hydrazine | concentration of trichloroethylene in the liquid phase (ppb) | |
|---|---|---|---|
| | | 0.5 hr | 1 hr |
| Ir | added | 169 | — |
| | not added | — | 294 |
| Ru | added | 261 | 267 |
| | not added | —. | 309 |
| Pd | added | 10.5 | 2.8 |
| | not added | — | 308 |
| Pt | added | 24.8 | 12.2 |
| | not added | — | 273 |

EXAMPLE 2

Trichloroethylene was decomposed by the same method as in Example 1 except that a solution containing about 200 ppb of trichloroethylene was used, palladium was used as the catalyst metal and a different catalyst carrier selected was used. The results are shown in Table 2.

TABLE 2

| catalyst carrier | hydrazine | concentration of trichloroethylene in the liquid phase (ppb) | |
|---|---|---|---|
| | | 0.5 hr | 1 hr |
| zirconia | added | 65.6 | 48 |
| | not added | — | 192 |
| silica gel | added | 147 | 132 |
| | not added | 196 | 201 |
| strong basic anion exchange resin | added | — | 28 |
| | not added | — | 56 |

EXAMPLE 3

Into a column of 15 mm in inner diameter, 16.2 g of a catalyst in which 0.5 weight % of palladium supported on γ-alumina were packed to form a catalyst layer of 100 mm in length. A solution containing about 300 ppb of trichloroethylene taken from a feed water tank was passed through the column at a velocity of about 10 hr$^{-1}$ SV using a pump. At the same time, an aqueous solution of hydrazine was introduced to the column from a tank of an aqueous solution of hydrazine using a pump in such a way that the concentration of hydrazine in the water for treatment was adjusted to 250 ppm. After the treated water was taken into a sampling bottle and stirred, samples were taken from the head space of the sampling bottle and analyzed by gas chromatography. The temperature of the treatment was 25° C. The results are shown in Table 3.

TABLE 3

| time of passing of water (hr) | concentration of trichloroethylene in the liquid phase (ppb) | removal (%) |
|---|---|---|
| 1 | 23.6 | 91.8 |

TABLE 3-continued

| time of passing of water (hr) | concentration of trichloroethylene in the liquid phase (ppb) | removal (%) |
| --- | --- | --- |
| 2 | 11.3 | 96.1 |
| 4 | 15.4 | 94.7 |
| 8 | 11.7 | 95.9 |

EXAMPLE 4

Samples containing volatile organic halogenated compounds were treated by the same method as in Example 3 except that various kinds of volatile organic halogenated compounds were used instead of trichloroethylene. The results are shown in Table 4.

TABLE 4

| volatile organic halogenated compound | hydrazine | concentration in the liquid phase (ppb) 0.5 hr | 1 hr | initial concentration (ppb) |
| --- | --- | --- | --- | --- |
| chloroform | added | 202 | 182 | 535 |
| | not added | 555 | 578 | |
| carbon tetrachloride | added | 20 | 13 | 154 |
| | not added | 503 | 542 | |
| 1,1,1-trichloroethane | added | 84 | 78 | 357 |
| | not added | 327 | 389 | |
| tetrachloroethylene | added | 223 | 187 | 324 |
| | not added | — | 331 | |

EXAMPLE 5

To about 2 liter of nitrogen gas containing about 5.5 volume ppm of trichloroethylene gas, 0.5 g of a palladium catalyst containing 0.5 weight % of palladium supported on alumina and 2.24 ml of hydrogen gas were added and mixed well by stirring at 25° C. Samples were taken out from time to time at specified time intervals and analyzed by gas chromatography.

For comparison, a mixture without addition of hydrogen gas with addition of the catalyst alone, a mixture without addition of the catalyst with addition of hydrogen gas alone and a mixture without addition of both of hydrogen gas and the catalyst were heated by the same method. The results are shown in Table 5.

TABLE 5

| | | | concentration of trichloroethylene gas (vol. ppm) | | | |
| --- | --- | --- | --- | --- | --- | --- |
| | | | | time after addition of hydrogen | | |
| No. | catalyst | hydrogen | initial | 10 min. | 30 min. | 1 hr |
| 1 | none | none | 5.6 | 5.6 | 5.9 | 6.2 |
| 2 | added | added | 4.2 | 2.2 | 0.6 | 0.2 |
| 3 | added | none | 4.3 | 4.4 | 4.3 | — |
| 4 | none | added | 4.4 | 4.3 | 4.4 | — |

EXAMPLE 6

An apparatus for conducting the following processes was constructed: feed water is introduced into an air-stripping tower; nitrogen gas is blown into the air-stripping tower from a nitrogen receiver; the aeration gas obtained by this process is taken out from the upper part of the airstripping tower and mixed with hydrogen gas; the mixed gas is introduced into the column packed with a catalyst; and the volatile organic halogenated compounds are decomposed by reduction.

Into an air-stripping tower 1.7 m in diameter and 7.6 m in height packed with Net Ring TC-1®, feed water containing 100 µg/l of trichloroethylene was introduced at the speed of 90 m$^3$/hr. The water was treated with aeration by passing 3000 m$^3$/hr of nitrogen gas based on the standard conditions. The concentration of trichloroethylene in the treated water was a 2 µg/l or less. The concentration of trichloroethylene was 0.5 volume ppm and the concentration of oxygen was 300 volume ppm in the gas discharged from the outlet of the tower.

Hydrogen gas was added to the gas discharged from the outlet of the air-stripping tower at the rate of 90 g/hr and the mixed gas was introduced to a catalytic decomposition tower 1.2 m in diameter and 1.5 m in height packed with 1500 kg of pellets of 0.5% platinum supported on γ-alumina particles 3 mm in diameter and 3 mm in length. Trichloroethylene was not detected at the outlet of the catalytic decomposition tower. The nitrogen gas could be used repeatedly by recycling.

EXAMPLE 7

A gas containing 295 volume ppb of trichloroethylene in nitrogen gas was passed through a column packed with 50 K of a platinum catalyst containing 0.5 weight % of platinum supported on γ-alumina at a speed of 10 N-l/min (SV: 12,000 hr$^{-1}$). Hydrogen gas was added to the sample gas at the inlet of the catalyst column at a speed of 10 N-ml/min. The temperature of the experiment was 25° C. Trichloroethylene in the gas at the outlet of the catalyst column was measured by a gas chromatography. The results are shown in Table 6.

TABLE 6[1]

| | results of decomposition of trifluoroethylene (vol. ppb) | | |
| --- | --- | --- | --- |
| sample gas | time after addition of hydrogen (min) | | |
| (vol. ppm) | 10 | 30 | 70 |
| 295 | 11.5 (96.1%) | 9.0 (96.9%) | 7.3 (97.5%) |

[1]Numbers in the parenthesis show rate of the removal.

EXAMPLE 8

A gas containing 680 volume ppb of trichloroethylene in air was passed through a column 25 mm in inner diameter and 100 mm in length packed with 60 g of a platinum catalyst containing 0.5 weight % of platinum supported on γ-alumina at a speed of 10 N-l/min (SV: 12,000 h$^{-1}$). Hydrogen gas was added to the sample gas at the inlet of the catalyst column at a speed of 0.1 N-l/min. The temperature of the experiment was 26° C. Trichloroethylene in the treated gas was analyzed by a gas chromatography. The results are shown in Table 7.

TABLE 7[1]

| sample gas | results of decomposition of trifluoroethylene (vol. ppb) | | |
|---|---|---|---|
| | time after addition of hydrogen (min) | | |
| (vol. ppm) | 20 | 40 | 80 |
| 680 | 18.6 (97.3%) | 12.2 (97.5%) | 16.5 (97.6%) |

[1]Numbers in the parenthesis show rate of the removal.

EXAMPLE 9

Ion exchange pre-treatment of feed water

To a prepared water (feed water) having the quality shown in Table 8, hydrogen was dissolved at the partial pressure of hydrogen of 3 kg/cm$^2$·G and the water was then passed through a catalyst column 40 mm in inner diameter and 200 mm in height packed with about 260 g of a platinum catalyst containing 0.5 weight % of platinum supported on γ-alumina at a speed of SV 20 h$^{-1}$. The efficiency of the treatment varied with time. The initial removal was about 90%. The removal decreased to 50% to 60% after about 100 BV of feed water was treated. The quality of the treated water (A) is shown in Table 8.

The feed water was passed through an ion exchange column 100 mm in inner diameter and 120 mm in height packed with about 1 liter of a sodium type ion exchange resin PK-228® at the speed of SV 10 to 20 hr$^{-1}$. The water (B) treated with the ion exchange resin and having the quality shown in Table 8 was treated with decomposition by reduction under the conditions described above in the liquid phase. After about 100 BV of the water for treatment had been passed through the column, the efficiency of treatment was almost the same value of about 85%, showing no such decrease in efficiency with time as described above. The quality of the treated water (C) is shown in Table 8.

TABLE 8

| | | treated water | | |
|---|---|---|---|---|
| | feed water (prepared water) | A after passing 100 BV | B after treatment with ion exchange | C after passing 100 BV |
| quality of water | | | | |
| trichloroethylene (mg/l) | 1.0 | 0.50 | 0.81 | 0.15 |
| cis-dichloro-ethylene (mg/l) | 1.0 | 0.41 | 0.72 | 0.11 |
| Ca$^{2+}$ (mg/l) | 37.2 | 32.1 | 0.25 | 0.21 |
| Mg$^{2+}$ (mg/l) | 16.1 | 12.1 | 0.08 | 0.08 |
| total Fe (mg/l) | 7.21 | 3.06 | 1.76 | 1.62 |
| pH | 7.3 | 7.7 | 7.5 | 7.8 |

EXAMPLE 10

Chelate exchange treatment of feed water

The same feed water as that used in Example 9 was treated with a chelate exchange resin PT207® by the same method as that with the ion exchange resin used in Example 9. The water treated with the chelate exchange resin was then treated with decomposition by reduction in the liquid phase by the same method as that of Example 9. The removal rate of the treatment stayed at about the same level of 80% to 90% to though the values were somewhat scattered.

EXAMPLES 11 to 13

Samples of a feed water containing trichloroethylene at the concentrations shown in Table 9 were treated by the apparatus shown in FIG. 1. The rate of removal of the trichloroethylene is shown in Table 9.

A reaction column 20 mm in inner diameter and 300 mm in length was packed with a catalyst containing 0.5 weight % of platinum supported on γ-alumina of ⅛ inch pellets to the height of 100 mm in the column. Glass beads of about 2 mm in diameter were packed in the upper part of the catalyst column.

The feed water was passed through this catalyst column at a speed of 5 ml/min and space velocity to the catalyst column of 10 h$^{-1}$. Hydrogen gas was provided at a feeding pressure of 1 kg/cm$^2$·G.

EXAMPLE 14

Samples of a feed water containing tetrachloroethylene at the concentrations shown in Table 9 were treated by the same method as that in Examples 11 to 13 and then the removal of tetrachloroethylene was measured, The results are shown in Table 9.

TABLE 9

| | volatile organic halogenated compound in feed water | | removal of volatile organic halogenated compound (%) |
|---|---|---|---|
| Example | compound | concentration (mg/l) | |
| 11 | trichloroethylene | 12 | ca. 99 or more |
| 12 | trichloroethylene | 19 | ca. 99 or more |
| 13 | trichloroethylene | 26 | ca. 99 or more |
| 14 | tetrachloroethylene | 14 | ca. 95 |

EXAMPLE 15

Heating of the gas for treatment in the catalyst column

Water containing trichloroethylene was introduced into an airstripping tower and sprayed at the top of the tower while air was introduced from the bottom by a blower to bring them into the counter current contact with each other. A gas containing 0.5 volume ppm of trichloroethylene and having relative humidity of 90% at 25° C. was obtained by the treatment.

The gas containing trichloroethylene was passed through a catalyst column 30 mm in inner diameter and 70 mm in length packed with about 50 g of a catalyst containing 0.5 weight % of platinum supported on γ-alumina at the speed of SV 12,000 hr$^{-1}$ together with hydrogen gas supplied from a hydrogen generator. The concentration of trichloroethylene in the effluent gas at the outlet of the catalyst column was almost equal to that of the feed gas after 8 hours from the beginning of the addition of hydrogen.

The decomposition treatment by reduction in the gas phase was continued for 7 days in the same condition as that described above except that water kept at the constant temperature of about 40° C. was circulated through the jacket of the column to heat the catalyst column. The rate of removal of trichloroethylene by the treatment did not change with time and stayed at the same value of about 85%.

EXAMPLE 16

Dilation with dry air

Air containing 0.5 volume ppm of trichloroethylene and having a relative humidity of 90% at 25° C. was obtained by the same method as that in Example 15. Dry air having about 0% relative humidity prepared in a PSA apparatus was mixed with the humid air at 1:1 volume ratio. The mixed gas was then passed through the catalyst column by the same method as that in Example 15 for the decomposition treatment by reduction. The removal of trichloroethylene was about 80% to 90% and the treatment was continued for 7 days.

As the PSA apparatus, two adsorption towers of 0.5 liter volume, 40 mm in diameter and 400 mm in height packed with a synthetic zeolite 5A were utilized. The operation was conducted at 9 kgf/cm$^2$ adsorption pressure and 10 minutes cycle time.

EXAMPLE 17

Removal of humidity with a cation exchange resin

Air containing 0.5 volume ppm trichloroethylene and having 90% relative humidity at 25° C. was obtained by the same method as that in Example 15 and then passed through a column 30 mm in inner diameter and 700 mm in length packed with 500 ml of a sodium type strong cation exchange resin SK 1B® at a speed of SV 5,000 hr$^{-1}$. The concentration of trichloroethylene at the outlet remained about the same as that at the inlet of the column, showing that trichloroethylene was not adsorbed by the resin. The relative humidity of the gas was reduced to 1 to or less at the outlet.

The dehumidified gas thus obtained, was used for the decomposition treatment by reduction by passing it through the catalyst column by the same method as that of Example 15. Trichloroethylene was not detected in the treated gas at the outlet of the column. The treatment was continued for 30 hours. The operation was stopped after 30 hours and the ion exchange resin was heated to 150° C. for 1 hour to remove water therein by vaporization. When the operation was resumed by the same condition, the operation could be continued for a further 30 hours without any problem.

EXAMPLE 18

An underground water containing 50 ppm of trichloroethylene was introduced to an air-stripping tower 1.7 m in diameter and 7.5 m in height and sprayed from the top of the tower at a speed of 9 m$^3$/hr while air was blown at a speed of 300 Nm$^3$/hour from the bottom of the tower to bring them into counter current contact with each other. After treatments conducted twice in series, the concentration of trichloroethylene in the treated water at the outlet of the air-stripping tower was 20 ppb and the concentration of trichloroethylene in the discharged air was about 100 volume ppm.

The discharged air was led to a rotor type adsorption apparatus containing about 2.6 kg of activated carbon fiber as an adsorbent for adsorption of the trichloroethylene. The concentration of trichloroethylene in the treated gas was about 2 volume ppm.

The treated gas was introduced to a catalyst column packed with 60 kg of a platinum catalyst containing 0.5 weight % of platinum supported on γ-aluminum and hydrogen gas was mixed with the gas at the inlet of the catalyst column at a speed of 3 Nm$^3$/h. Trichloroethylene was not detected in the treated gas at the outlet of the catalyst column.

When steam was introduced into the column containing the activated carbon fiber, condensed water containing 170 ppm of trichloroethylene was discharged from the column.

The condensed water was recycled to the feed water tank.

EXAMPLE 19

The apparatus shown in FIG. 3 was used in this example.

An underground water containing 0.1 ppm of trichloroethylene was introduced into an air-stripping tower 1.7 m in diameter and 7.5 m in height packed with Net Ring TS-1® to the height of 3 m and sprayed from the top of the tower at a speed of 90 m$^3$/he while air was blown from the bottom of the tower at a speed of 3000 Nm$^3$/hr to bring them into counter current contact with each other. The concentration of trichloroethylene in the water at the outlet of the air-stripping tower was 2 ppb and the concentration of trichloroethylene in the exhausted air was 0.5 volume ppm.

The exhausted air was introduced into adsorption tower 4 packed with a granular activated charcoal Shirasagi SX 4-6 mesh® (a product of Takeda Chemical Industries Co., Ltd.) to a height of 0.3 m and a diameter of 1.7 m for adsorption of the trichloroethylene. The concentration of trichloroethylene in the air after the adsorption treatment remained at 0.05 volume ppm or less until the time of the operation reached 120 hours. The operation of the activated charcoal adsorption tower was stopped after 120 hours and the air inside was purged with 7 Sm$^3$ of nitrogen gas.

For regeneration of the activated charcoal, nitrogen gas heated to 150° C. was passed through the tower at a speed of 300 Nm$^3$/hr for desorption of the trichloroethylene from the activated charcoal. To the gas discharged from the desorption process, 60 g (672 liter) of hydrogen gas was added and the mixed gas was introduced to catalytic decomposition tower 1 packed with 60 kg of the palladium-γ-alumina catalyst.

Nitrogen gas mixed with hydrogen gas was circulated in a closed cycle from activated charcoal adsorption tower 4 to catalytic decomposition tower 1 for 16 minutes using a compressor. Trichloroethylene was not detected in the nitrogen gas after 15 minutes.

EXAMPLE 20

The apparatus shown in FIG. 4 was used in this example.

An underground water containing 0.1 ppm of trichloroethylene was introduced to an air-stripping tower of 1.7 m in diameter and 7.5 m in height packed with Net Ring TS-1® to the height of 3 m and sprayed from the top of the tower at a speed of 9 m$^3$/he while air was blown at a speed of 300 Nm$^3$/hr to bring them into counter current contact with each other. The concentration of trichloroethylene in the water at the outlet of the tower was 2 ppb and the concentration of trichloroethylene in the discharged air was 0.6 volume ppm.

The discharged air was introduced to rotor type adsorption tower 4 packed with about 2.6 kg of the activated carbon fiber for adsorption of the trichloroethylene. The concentration of trichloroethylene in the air after the adsorption treatment remained at 0.05 volume ppm or less until the time of the operation reached 10 hours. The operation of the activated carbon fiber adsorption tower was stopped after 10 hours and then the activated carbon fiber was regenerated by feeding steam at a pressure of 4 kg/cm$^2$ and a speed of 25 kg/hr. The time required for the regeneration was about 1 hour.

Water obtained by cooling the gas discharged by the regeneration to room temperature by a condenser contained 350 ppm of trichloroethylene. This water was not reused but treated with decomposition by dissolving hydrogen gas into the water at a partial pressure of hydrogen of 3 to 4 kg/cm2, followed by circulation in catalyst tower 1 packed with 2 liter of a platinum/γ-alumina catalyst at the speed of SV 50 $hr^{-1}$. Trichloroethylene was not detected in the recycled water after 6 hours.

EXAMPLE 21

The apparatus shown an FIG. 5 was used in this example.

The regeneration water obtained in Example 20 was sent to aeration tank 9 and a gas containing the volatile organic halogenated compounds was obtained by aeration of the water with nitrogen gas at a speed of 3 $Nm^3$/hr. Hydrogen gas was added to the gas thus obtained at a speed of 2 g/hr and the mixed gas was treated by the same method as that in Example 20 except that the gas was circulated in catalyst tower 1 packed with 1 liter of the same catalyst as that of Example 20, Trichloroethylene was not detected in the gas thus treated after 30 minutes.

EXAMPLE 22

Underground water containing 0.1 mg/l of trichloroethylene was introduced to an air-stripping tower 1.7 m in diameter and 7.5 m in height and sprayed from the top of the tower at a speed of 90 $m^3$/hr while air was blown from the bottom at a speed of 3000 $Nm^3$/hr to bring them into the counter current contact with each other. The concentration of trichloroethylene in the water at the bottom of the tower was about 2 μg/l and the concentration of trichloroethylene in the discharged gas at the top of the tower was 0.5 volume ppm. The relative humidity was 90% or more.

Hydrogen was added to the discharged gas obtained above at a speed of 6 $Nm^3$/hr and the mixed gas was introduced to a catalyst tower 2 m in inner diameter and 0.3 m in height packed with 750 kg of a platinum/γ-alumina catalyst containing 0.5 weight % of platinum (⅛ inch pellets) supported on γ-alumina. The rate of removal of trichloroethylene was 80% to 90% or more during the period of 2 hours after the start of the operation. However, after 3 hours or more of the operation, trichloroethylene was removed by decomposition only to a negligible degree.

The same discharged gas was treated by the same method as that described above except that a catalyst rendered hydrophobic by a coating of polytetrafluoroethylene on the platinum/γ-alumina catalyst containing 0.5 weight % of platinum (⅛ inch pellets) was used. Trichloroethylene in the charged gas could be removed by decomposition at a constant removal of about 70% to 90% for 50 hours in the catalyst tower.

EXAMPLE 23

Hydrogen was dissolved in an underground water containing 0.35 mg/l of trichloroethylene at the partial pressure of hydrogen of 3 kg/$cm^2$. The water thus prepared was introduced into a catalyst tower 100 mm in inner diameter and 100 mm in height packed with about 0.8 kg of a platinum/γ-alumina catalyst containing 0.5 weight % of platinum (⅛ inch pellets) at the speed of 16 l/hr (SV=20 $hr^{-1}$). The rate of removal of trichloroethylene was about 70% during the initial period of the operation. The removal rate decreased with time and became about 40% after 5 hours of the treatment. The catalyst column was colored red brown.

The same water was treated according to the same operation as that described above except that a catalyst rendered hydrophobic by a coating of polytetrafluoroethylene on the platinum/γ-alumina catalyst containing 0.5 weight to of platinum (⅛ inch pellets) was used. The initial rate of removal of trichloroethylene was about 85% and no change in the efficiency of the treatment was found after 5 hours of the continuous operation.

EXAMPLE 24

A gas containing 10 volume ppm of difluorochloromethane (Flon 22) was continuously treated with 50 ml of a platinum/γ-alumina catalyst containing 0.5 weight % of platinum at the GHSV of 1000 $hr^{-1}$ by adding 1000 volume ppm of hydrogen gas thereto. The operation was carried out at atmospheric pressure and at 30° C.

The treated gas was analyzed by gas chromatography and the removal by decomposition of Flon 22 was obtained from the ratio of the concentrations of Flon 22 at the inlet and at the outlet of the test column.

The initial rate of removal by decomposition of Flon 22 was 90% or more and gradually decreased to 80% after 20 days of the operation.

EXAMPLE 26

The gas containing Flon 22 was treated and analyzed by the same method as in Example 24 except that a platinum-ZSM5® (zeolite) catalyst containing 0.5 weight % of platinum was used. The removal of Flon 22 remained at the initial value of 90% or more after operation for 30 days.

EXAMPLE 26

A gas containing difluorodichloromethane (Flon 12) was treated and analyzed by the same method as in Example 25. The removal of Flon 12 was 90% or more.

EXAMPLE 27

A gas containing fluorotrichloromethane (Flon 11) was treated and analyzed by the same method as in Example 25. The removal of Flon 11 was 90% or more.

EXAMPLE 28

To a gas extracted from a soil (with atmospheric air) containing about 10 volume ppm of trichloroethylene, hydrogen gas was added to provide a concentration of hydrogen in the mixed gas of about 2% (v/v). The mixed gas was introduced into a catalyst column 80 mm in inner diameter and 200 mm in height packed with about 1 liter of a palladium/γ-alumina catalyst containing 0.5 weight % of palladium at the speed of SV 6,000 $hr^{-1}$ and treated in a single stage process. The removal of trichloroethylene was about 70% to 80%.

The same gas was treated in a multi-stage process containing four stages using the apparatus shown in FIG. 6. Hydrogen gas was added in each of the stages in an amount to provide concentration of hydrogen gas of about 0.5% (v/v). In the columns of each of the stages, about 250 ml of the same catalyst were packed. The gas was treated at a speed of SV 24,000 in each of the four stages. The total amount of catalyst and hydrogen gas employed were the same as the treatment described above. Trichloroethylene was not detected in the gas treated with this method, unlike the gas treated by the method described above.

EXAMPLE 29

Air containing 100 volume ppm of trichloroethylene was treated with the decomposition by reduction at room temperature, atmospheric pressure and gas flow rate of SV 1000 $hr^{-1}$ in the hydrogen stream of 200 ml/min in the presence of 50 g of a platinum/γ-alumina catalyst containing 0.5 weight % of platinum (3 mm pellets). The rate of removal of trichloroethylene was 75%. In the treated gas, 25 volume ppm of residual undecomposed trichloroethylene and a small amounts of ethane and other reaction intermediates were detected.

The same treated gas used in the above treatment was passed through a column packed with 200 g of granular activated charcoal Shirasagi SX200® (a product of Takeda Chemical Industries Co., Ltd.) at the speed of 100 $h^{-1}$ SV, the room temperature and the atmospheric pressure. Ethane contained in the gas was partially removed at the early stage of the reaction but thereafter passed through the column without decomposition after a short period of operation. Other unreacted compounds and reaction intermediates were not detected in the treated gas.

The treatment of decomposition by reduction and the adsorption treatment were continued for 6 hours. Then, the adsorption column was replaced with a new adsorption column and the treatment of decomposition by reduction and the adsorption treatment were resumed. Nitrogen heated at 80° C. was passed through the adsorption column which had been used in the adsorption treatment at a speed of SV 1000 $hr^{-1}$ to desorb adsorbed substances from the activated charcoal column. The gas discharged by the regeneration was mixed with the air containing 100 volume ppm of trichloroethylene and then recycled to the process of decomposition by reduction. The treatment with activated charcoal was repeated twice and no change was found in the composition of the treated gas.

EXAMPLE 30

An underground water containing 0.1 mg/l of trichloroethylene was introduced to an air-stripping tower 1.7 m in diameter and 7.5 m in height and sprayed from the top of the tower at the speed of 9 $m^3$/hr while air was blown from the bottom of the tower at a speed of 300 $Nm^3$/hr to bring them into the counter current contact with each other. The concentration of trichloroethylene in the water at the bottom of the tower was about 2 µg/l and the concentration of trichloroethylene in the discharged gas at the top of the tower was 0.5 volume ppm.

Hydrogen was added to the discharged gas obtained above at a speed of 3.0 $Nm^3$/hr and the mixed gas was introduced to a catalyst tower 1.2 m in inner diameter and 0.8 m in height packed with 750 kg of a platinum/γ-alumina catalyst containing 0.5 weight % of platinum (⅛ inch pellets). Trichloroethylene was not detected in the gas discharged from the catalyst tower.

The gas discharged from the catalyst tower was passed through an apparatus for removing hydrochloric acid. The apparatus had a column for absorption of hydrochloric acid gas containing 300 liter of 5 weight % aqueous solution of sodium hydroxide. The discharged gas was passed through the apparatus for thermal decomposition using about 500 liter of a platinum catalyst at the speed of 600 $hr^{-1}$ SV and at 400° to 450° C. In the gas discharged from this apparatus, trichloroethylene and hydrochloric acid was not detected and no hydrocarbon such as ethane and methane, was detected either. Thus, the discharged gas could be discharged into the atmosphere without any further treatment.

EXAMPLE 31

An apparatus for biological decomposition for the following processes was constructed: feed water was introduced to an air-stripping tower; air was blown into the feed water in the stripping tower from a blower; the aeration gas from this process was taken from the top of the stripping tower; the aeration gas thus obtained was mixed with hydrogen gas; the mixed gas was introduced into a column packed with a reducing catalyst to reduce volatile organic halogenated compounds; and the mixed gas was introduced to a column packed with packings on which microorganisms were supported for biological decomposition of the hydrocarbon formed by the reduction.

Feed water containing 100 µg/l of trichloroethylene was introduced to an air-stripping tower 1.7 m in diameter and 7.5 m in height packed with Net Ring TS-1® at a speed of 90 $m^3$/hr and then treated by aeration by passing the air at a speed of 3000 $m^3$/hr based standard conditions. Trichloroethylene in the treated water was 2 µg/l or less and the concentration of trichloroethylene in the gas at the outlet of the airstripping tower was 0.5 volume ppm.

To the gas discharged from the air-stripping tower, hydrogen was added at a speed of 30 $Nm^3$/hr and the mixed gas was introduced to a catalytic decomposition tower 1.2 m in diameter and 1.5 m in height packed with 1500 kg of pellets 3 mm in diameter and 3 mm length of the platinum-alumina catalyst containing 0.5 weight % of platinum. Trichloroethylene was not detected in the gas discharged from the outlet of the catalyst tower. The gas discharged from the outlet of the catalyst tower was introduced without further treatments to a biological decomposition tower 1000 mm in diameter and 7200 mm in height packed with a column of peat 3600 mm in height to which microorganisms had been loaded by spraying sewage water at a speed of 3,000 $hr^{-1}$ SV.

Hydrocarbons, such as ethylene, methane and the like, were not detected in the gas discharged from the biological decomposition tower.

As a Comparative Example, an operation was run by the same method as that described above except that the catalyst tower was eliminated and hydrogen gas was not added and the ability of the operation to remove trichloroethylene was evaluated. The results are shown in Table 10. The analysis was gas chromatography.

TABLE 10[1)]

|  | Example 31 | | | Comparative Example |
|---|---|---|---|---|
|  | trichloro-ethylene | ethylene | methane | trichloro-ethylene |
| after 10 hours | ND | ND | ND | 0.5 |
| after 50 hours | ND | ND | ND | 0.6 |
| after 100 hours | ND | ND | ND | 0.4 |
| after 200 hours | ND | ND | ND | 0.5 |

[1)]Concentration of the compounds shown in the table at the outlet of the catalyst tower was analyzed. ND means that the compound was not detected. The number shows the concentration of the compound in volume ppm.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A process for decomposing a volatile organic halogenated compound in a water-containing composition which contains the volatile organic halogenated compound in an amount of not more than 20 ppm and contains at least one of the metal ions of iron, manganese or a hardness component, which process comprises the steps of removing the metal ions from the water-containing composition by at least one treatment selected from the group consisting of ion exchange treatment, chelate resin treatment and oxidation-coagulation-precipitation treatment and then contacting the water-containing composition having metal ions removed with a hydrogen gas reducing agent in the presence of a palladium or a platinum catalyst.

2. A process as claimed in claim 1, wherein the water-containing composition containing the volatile organic halogenated compound is obtained by extraction of service water, underground water or soil.

3. A process as claimed in claim 1, wherein the water-containing composition having metal ions removed is contacted with the reducing agent at a temperature of 10° to 60° C.

4. A process as claimed in claim 1, wherein the catalyst comprises palladium metal or platinum metal deposited on a carrier in an amount from 0.1 to 10% of the weight of the carrier.

5. A process as claimed in claim 1, wherein the amount of the reducing agent is 1 to 80 times the equivalent amount required to decompose all of the volatile organic halogenated compound.

6. A process as claimed in claim 1, wherein the reducing agent is dissolved in the water-containing composition having metal ions removed before it is brought in contact with the palladium catalyst or the platinum catalyst.

7. A process as claimed in claim 1, wherein the water-containing composition is obtained by bringing water discharged from a manufacturing process containing more than 20 ppm of the volatile organic halogenated compound in contact with an adsorbent to remove a portion of the volatile organic halogenated compound.

8. A process as claimed in claim 7, wherein the water-containing composition is obtained by condensing steam used to regenerate an adsorbent used to remove the volatile organic halogenated compound from water containing it.

9. A process as claimed in claim 1, wherein the palladium catalyst or the platinum catalyst is supported on a carrier treated with a hydrophobic compound.

10. A process as claimed in claim 1, which further comprises, after contact with the reducing agent in the presence of the palladium catalyst or the platinum catalyst, at least one further treatment selected from the group consisting of an adsorption treatment, a thermal decomposition treatment and a biological decomposition treatment.

* * * * *